(12) United States Patent
Inskeep

(10) Patent No.: US 9,653,933 B2
(45) Date of Patent: May 16, 2017

(54) PORTABLE AUTOMOTIVE BATTERY JUMPER PACK WITH DETACHABLE BACKUP BATTERY

(71) Applicant: Mathew Inskeep, Highland Beach, FL (US)

(72) Inventor: Mathew Inskeep, Highland Beach, FL (US)

( * ) Notice: Subject to any disclaimer, the term of this patent is extended or adjusted under 35 U.S.C. 154(b) by 170 days.

(21) Appl. No.: 14/533,181

(22) Filed: Nov. 5, 2014

(65) Prior Publication Data

US 2015/0130400 A1    May 14, 2015

Related U.S. Application Data

(60) Provisional application No. 61/902,978, filed on Nov. 12, 2013.

(51) Int. Cl.
*H02J 7/00* (2006.01)
*H02J 1/00* (2006.01)

(52) U.S. Cl.
CPC .............. *H02J 7/0054* (2013.01); *H02J 1/00* (2013.01); *H02J 7/0045* (2013.01); *H02J 2001/006* (2013.01)

(58) Field of Classification Search
None
See application file for complete search history.

(56) References Cited

U.S. PATENT DOCUMENTS

| | | | | |
|---|---|---|---|---|
| 7,771,221 B1* | 8/2010 | Blackwell | ............. | H01R 13/52 439/282 |
| 8,076,900 B1* | 12/2011 | Brown | .................... | F02N 11/14 320/105 |
| 2004/0239287 A1* | 12/2004 | Batts-Gowins | ....... | H02J 7/0054 320/103 |
| 2005/0003710 A1* | 1/2005 | Congdon | ............ | F02N 11/0866 439/620.01 |
| 2005/0162124 A1* | 7/2005 | Bertness | ............... | H02J 7/0054 320/105 |
| 2007/0285049 A1* | 12/2007 | Krieger | ............... | H01M 2/1055 320/105 |
| 2013/0241488 A1* | 9/2013 | Dao | ...................... | H02J 7/0022 320/111 |
| 2015/0171632 A1* | 6/2015 | Fry | ....................... | H02J 7/0004 307/22 |

* cited by examiner

Primary Examiner — Charlie Y Peng

(57) ABSTRACT

A Portable automotive battery jumper pack with detachable backup battery. The invention is configured to be user friendly with a flexible compact design. The invention will be used in the portable, automotive electronics area.

20 Claims, 4 Drawing Sheets

PORTABLE AUTOMOTIVE BATTERY JUMPER PACK WITH DETACHABLE BACKUP BATTERY

This application claims the benefit and priority of U.S. Ser. No. 61/902,978

STATEMENT REGARDING FEDERALLY SPONSORED RESEARCH

The invention was not made under government contract nor was funded grant money used to fund the research

FIELD

The present invention relates generally to a portable automotive battery jumper pack with detachable backup battery. Specifically, the invention comprises of a detachable backup battery within the main body of the battery jumper pack directed to the automotive and rechargeable consumer electronic arena.

BACKGROUND

This invention is distinctly different from a conventional automotive battery jump start system. Traditionally, a conventional battery jump start system's main purpose is to provide energy to depleted or weak automotive batteries, whenever the automotive battery cannot start the engine's electrical system due to lack of energy. In essence, a battery jump start system complements and aids in starting a failed system. Conventional battery jump starter systems may include features such as an area light, universal serial ports, power supply output receptacle. These features are integrated in a single embodiment making it cumbersome due to its heavy weight and lack of flexibility in design. These jump starter systems tend to be heavy and contain sealed lead acid batteries. Another downside is the conventional battery jump starter system must be recharged every few months in order to maintain a useful level of power. Continued charging is required because of the inherent self-discharge characteristic of internal batteries. If the unit is not properly charged, it will be of no use to the consumer when they find themselves with a dead or depleted automotive battery.

SUMMARY

The objective of the present invention is to provide a newer, efficient and easy to use jumpstarter with a method of combining two electrical systems to supplement overall performance and usefulness to the end user. First, the present invention achieves its objective by integrating a self-power management system that monitors the energy level of the main system battery and by the same system, replenishes the lost energy by drawing from the detachable backup battery pack. The system utilizes two different battery compositions. The main system will be comprised of a deep cycle sealed lead acid battery used for providing energy to a depleted or weak automotive battery requiring a quick boost in order to turn over (start) the engine's electrical system. The secondary system consists of a detachable back up battery pack made up a lightweight but high energy density cell similar to that of a lithium ion design.

This particular invention, will surpass conventional systems functional capabilities in several ways. First, this invention will compensate for the self-discharge characteristic of batteries by automatically trickle charging the main system battery for relatively long periods of time using the battery energy inside the detachable backup battery pack. Significantly, users will no longer have to monitor the level every few months, because the invention provides a high density energy battery inside the detachable backup battery pack with low self-discharge that can maintain the main system battery fully charged for up to a year or longer. In addition, the detachable pack can be detached and carried away from the main system jumper and used to recharge or power personal electronic devices. The user no longer is bound by the limitation of conventional system of having these features integrated in a bulky and singular heavy pack. It's to be noted that there is no direct connection between battery cells as in other system where two battery cells are directly coupled in a parallel configuration in order to increase their capacity and or transfer the energy between cells. The invention houses a first main system described as an automotive battery jumper pack to be used to jump start automotive batteries when they are weak or depleted. The invention also houses secondary system described as a detachable backup battery to be used as a trickle charger for the main system as well as to recharge and power personal electronic devices. The described systems coexist electrically and also independently from each other, as each of them contain their own integral battery as a source of energy.

DRAWINGS

DETAILED DESCRIPTION

A description of the invention is discussed in detail below. In describing the invention, specific terminology is employed for the sake of clarity. However, the invention is not intended to be limited to the specific terminology referenced herein. For clarity, the main system will also be describe as a complete portable automotive battery jumper (battery jumper).

Figure 1:
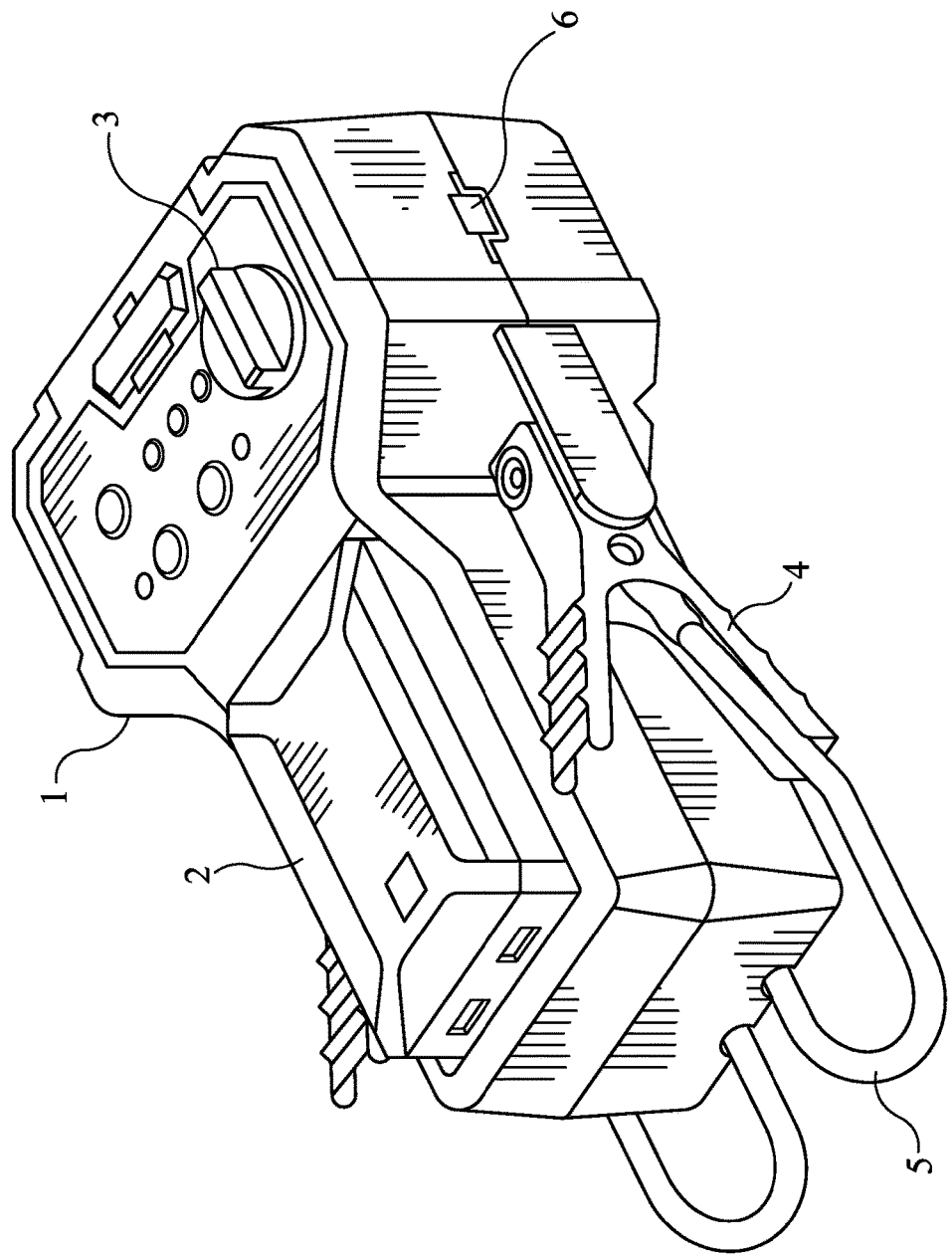
FIG. 1 is an overall image of the complete system with all the components that make up the portable automotive battery jumper pack with detachable backup battery.

Referring now to the images of the invention. The present invention includes two different types of system coupled together to perform different functions when working together or separately from each other. FIG. 1, is a complete portable automotive battery jumper with detachable backup battery pack. The apparatus is a self-contained structure as shown by the main system enclosure 1. The main system is contained within a series of deep cycle battery cells to be used as a supplement to automotive batteries. The main purpose of these cells is to provide energy to a vehicle whenever the vehicle battery is depleted and in need for a jump start to the electrical system of the vehicle. The main system enclosure 1, delivers the power to the electrical system via conductors of different voltage potential 5 in conjunction with its battery clamps 4. The system is safely activated to its jump start mode by using a manual power switch 6. The size of the battery jumper conductors 5 are typically #4AWG, and at least four feet of length. The size of the battery jumper may vary in thickness and in length depending on the application. The described battery jumper conductors 5 contained color-coded battery clamps 4 red (+) and black (−) and they are to be directly connected to depleted battery of the electrical system according to proper polarity. The battery clamps 4 can accommodate in vehicle batteries with top or side terminal posts. The color-coded battery clamps 4 are made of copper material for maximum energy transfer. The main systems 1 internal battery cells can be recharged via two methods First, the main system 1 is recharged by plugging in an external AC power supply through port 6. This will be the most efficient way to recharge the battery jumper's internal battery cells. The second method for charging the main system 1 internal battery cells is accomplished by using the detachable backup battery pack 2. The detachable backup battery pack 2 contains a high energy density cell that transfer the necessary charge to the main systems 1 internal battery cells using an integrated male barrel connector 10 which provides a mechanical connection as well as an electrical connection between both systems. The rate of charge between the detachable backup battery 2 and the main system 1 is managed internally by the boost circuit trickle charger shown on FIG. 4.

Figure 2:
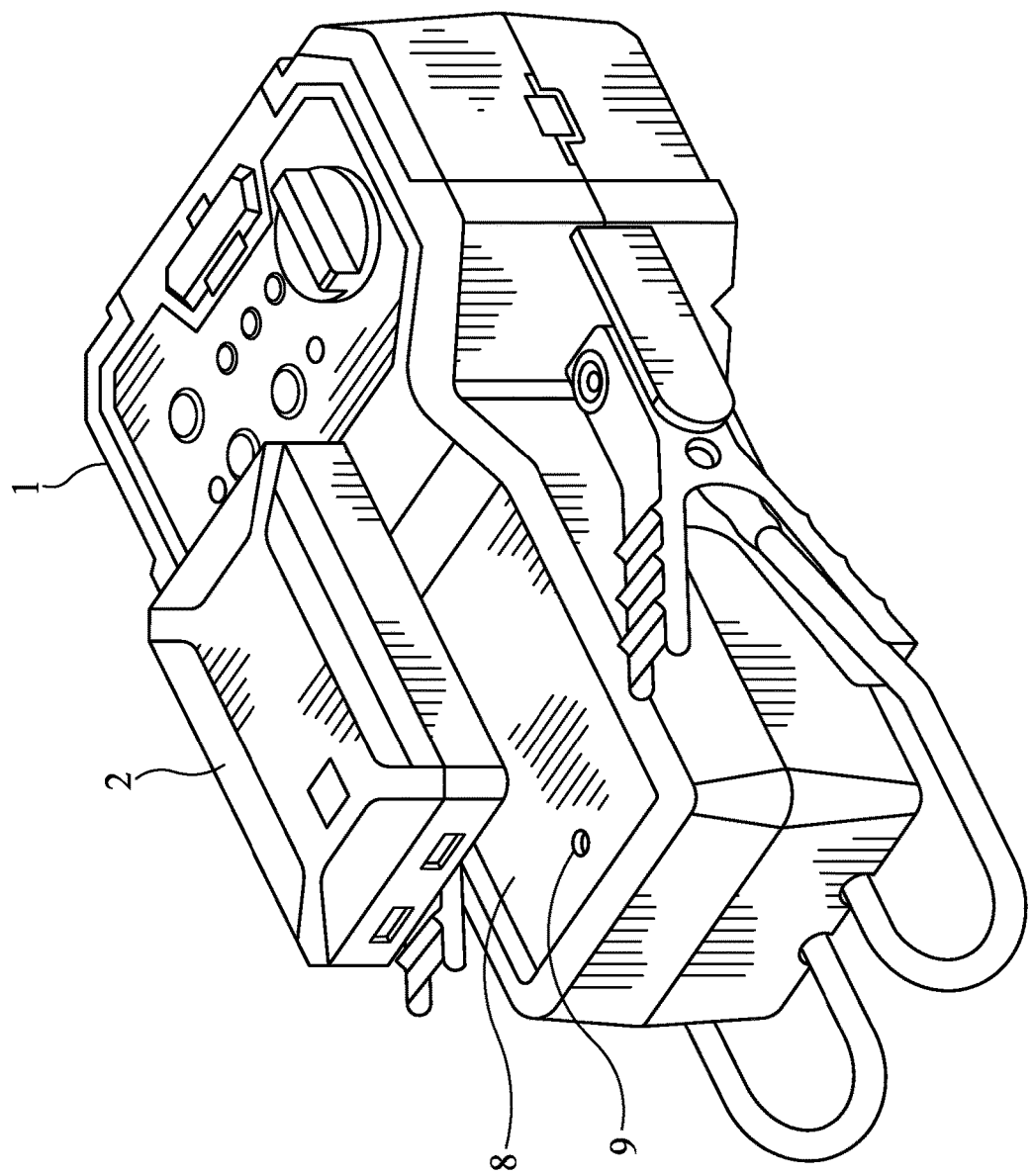
FIG. 2 is a view of both independent systems, including a view of the battery pack cradle and charging mechanism.

On FIG. 2 as supporting document to FIG. 1, the image illustrates the two systems. FIG. 2 shows how the portable automotive battery jumper pack and detachable backup battery are coupled. The main system 1 contains a cradle 8 that will house the detachable backup battery. The charging cradle 8 contains within a charging receptacle 9 that transfers energy from the detachable backup battery pack 2 to the main system 1 internal battery during trickle charging mode as in claim 6. The detachable backup battery pack 2 also contains a power switch 7 that activates the dual universal serial bus when user needs to power or recharge personal electronic devices. The detachable backup battery pack 2 is fully operational when is docked to the charging cradle 8 or when is outside the cradle 8. This grants access to the user to the dual USB ports 12 & 11 on FIG. 3 built into the detachable backup battery pack 2.

Figure 3:
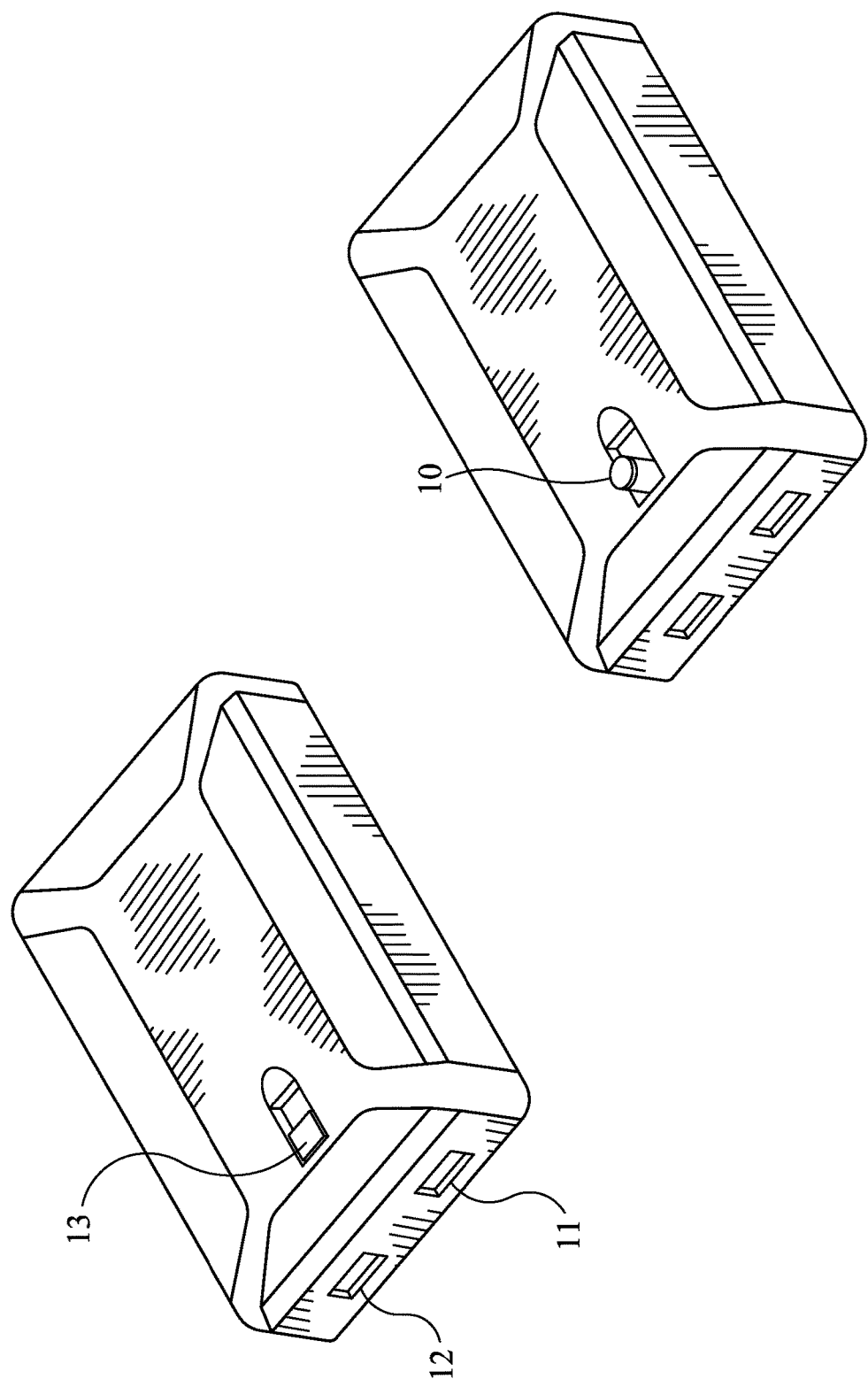
FIG. 3 is a bottom view of the detachable back up battery pack as an independent system as previously described to recharge and or power small electronic devices via universal serial ports. Also, it shows the flexible barrel used to trickle charge the main system.

Having a detachable backup battery pack provides users with an advantage over conventional systems. The user is not bound by a single integrated system. This particular component is referred on FIG. 1 as item 2. The detachable backup battery is also described on FIG. 3 where the bottom view can be appreciated. FIG. 3 shows the barrel pin connector 10. It's sole purpose is to trickle charge the main battery system as in claim 10. The barrel pin when not in use, is housed into the body of the detachable backup battery 13. This retractable barrel pin connector 13 will carry small amount of current whenever it is coupled to the main system charging receptacle as previously shown on FIG. 2

Figure 4:
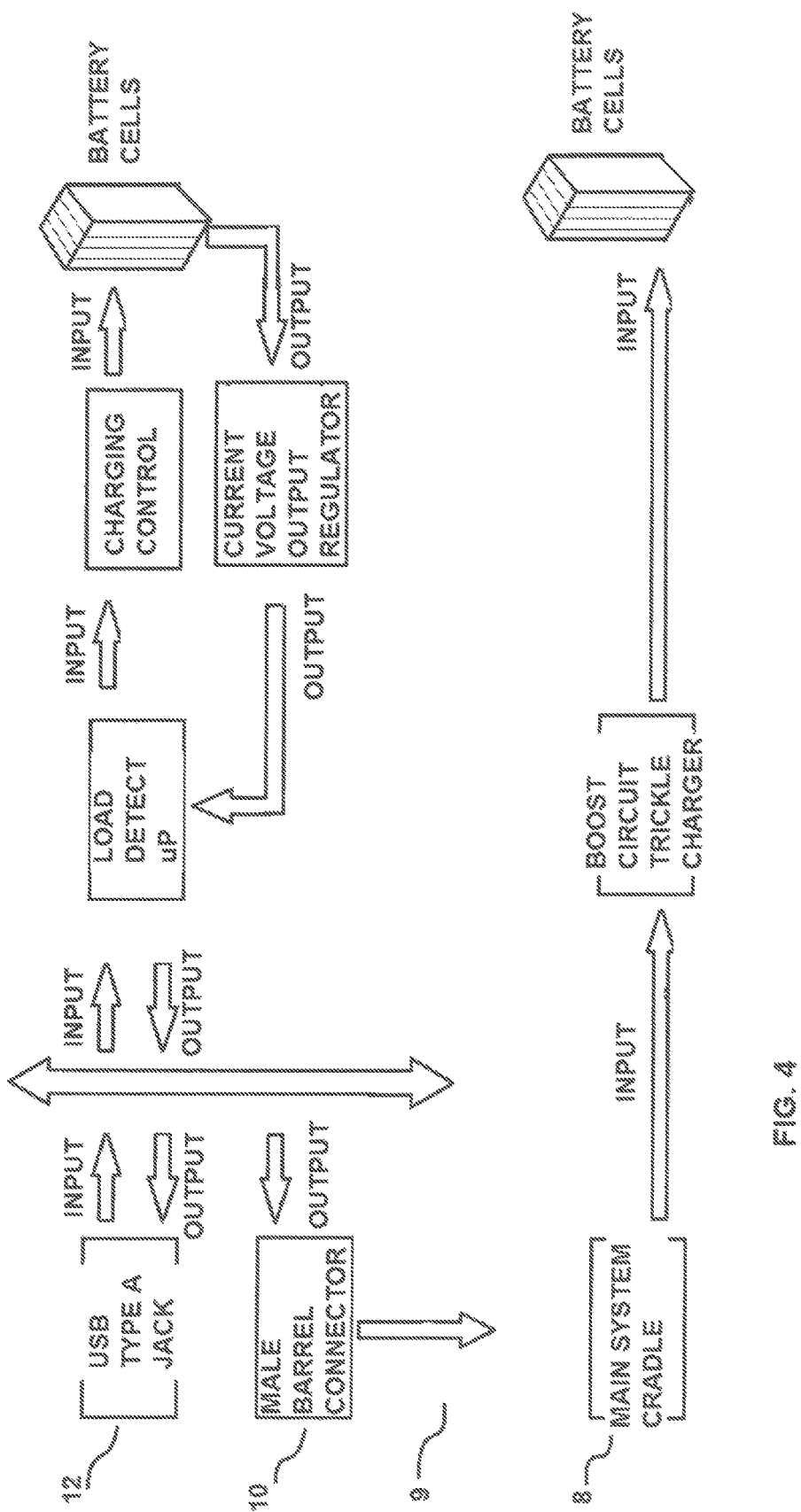
FIG. 4 shows an outline of the electrical diagram of the detachable back up battery pack internal operation and it's interaction with the battery jumper pack.

FIG. 4 shows a diagram of the invention's electrical system operations. The invention is powered from a series of independent battery cells. The battery cells could be of same or different chemistry but not the same voltage potential. The reason for the difference in voltage potential is because the detachable backup battery 13 is intended for small electronic applications and the jump pack battery is intended for automotive applications. The output of the detachable backup 7 battery is nominal five volt whereas the output of the jumper pack 1 is twelve volt. Therefore a boost converter circuit is built in the jumper pack 1 which increases the voltage from the detachable backup battery 13 without the need for increasing the number of cells. Simultaneously, the boost converter circuit provides a low charging current to the battery cells of the jumper pack 1. As initially described, this invention integrates a self-power management system that monitors the energy level of the main system battery and at the same time, replenishes the lost energy by drawing from the detachable backup battery pack 1 when this is connected to the dock station cradle 8.

What is claimed is:

1. A combination portable automotive vehicle battery jumper pack and detachable backup battery pack, comprising:
    a main system enclosure defining an internal area and an externally accessible cradle area;
    a first electrical system housed within the internal area of the main system enclosure, the first electrical system including at least one battery cell capable of providing enough energy to a depleted or weak automotive battery of a vehicle requiring a quick boost to start or turn over an engine's electrical system of the vehicle; and
    a detachable backup battery pack secured to the main system enclosure through being disposed within the externally accessible cradle area when in use for charging the at least one battery cell of the first electrical system, said backup battery pack having a second electrical system comprising a boost circuit trickle charger and at least one battery cell;
    wherein when the backup battery pack is disposed within the cradle the first electrical system is in electrical communication with the second electrical system and the boost circuit trickle charger supplies energy from the at least one battery cells of the second electrical system to the at least one battery cells of the first electrical system to ensure that the at least one battery cell is sufficiently charged to be able to start an electrical system of a vehicle in the event that a battery of the vehicle normally used to start the electrical system of the vehicle is depleted or too weak to properly function.

2. The combination portable automotive vehicle battery jumper pack and detachable backup battery pack of claim 1 wherein the at least one battery cell of the first electrical system is of a first battery type and the at least one battery cell of the second electrical system is of a second battery type that is a different type of battery from the first battery type of the first electrical system.

3. The combination portable automotive vehicle battery jumper pack and detachable backup battery pack of claim 2 wherein the first battery type is a deep cycle sealed lead acid battery and the second battery type is a high-energy density cell.

4. The combination portable automotive vehicle battery jumper pack and detachable backup battery pack of claim 3 wherein the second battery type is a lithium ion battery.

5. The combination portable automotive vehicle battery jumper pack and detachable backup battery pack of claim 1 further comprising a pair of conductors in electrical communication with the first electrical system and extending out of the main system enclosure.

6. The combination portable automotive vehicle battery jumper pack and detachable backup battery pack of claim 5 further comprising a first battery clamp electronically connected to a first conductor of the pair of conductors and disposed at an outer end of the first conductor and a second battery clamp electronically connected to a second conductor of the pair of conductors and disposed at an outer end of the second conductor.

7. The combination portable automotive vehicle battery jumper pack and detachable backup battery pack of claim 5 wherein a first conductor of the pair conductors having a first voltage potential and a second conductor of the pair conductors having a second voltage potential and the first voltage potential and the second voltage potential are different and not the same.

8. The combination portable automotive vehicle battery jumper pack and detachable backup battery pack of claim 1 wherein said first electrical system including electrical circuitry or components for monitoring an energy level of the at least one battery cell of the first electrical system and which are capable of replenishing lost energy of the at least one battery cell of the first electrical system by drawing energy from the at least one battery cell of the second electrical system of the backup battery pack when the backup battery pack is disposed within the cradle.

9. The combination portable automotive vehicle battery jumper pack and detachable backup battery pack of claim 1 wherein the backup battery pack further comprising at least one externally accessible USB port that is in electrical communication with the second electrical system, wherein the backup battery pack capable of charging or powering personal electronic devices through connection of a powering personal electronic device to the second electrical system through the at least one externally accessible USB port.

10. The combination portable automotive vehicle battery jumper pack and detachable backup battery pack of claim 1 wherein the backup battery pack having a rotatable male barrel connector in electrical communication with the second electrical system, the male barrel connector extending outward from a bottom surface of the backup battery pack in use to electrically connect the first electrical system to the second electrical system when the backup battery pack is disposed within the cradle area.

11. The combination portable automotive vehicle battery jumper pack and detachable backup battery pack of claim 9 wherein in use when said backup battery pack is properly disposed within the cradle area to mechanically secure the backup battery pack to the main system enclosure a portion of the backup battery pack having the at least one externally accessible USB port extends out of the cradle so not to cover the at least one USB port and to continue to allow access to the at least one USB port.

12. A combination portable automotive vehicle battery jumper pack and detachable backup battery pack, comprising:
 a main system enclosure defining an internal area and an externally accessible cradle area;
 a first electrical system housed within the internal area of the main system enclosure, the first electrical system including a first plurality of battery cells capable of providing enough energy to a depleted or weak automotive battery of a vehicle requiring a quick boost to start or turn over an engine's electrical system of the vehicle;
 a detachable backup battery pack secured to the main system enclosure through being disposed within the externally accessible cradle area when in use for charging the first plurality of battery cells of the first electrical system, said backup battery pack having a second electrical system comprising a boost circuit trickle charger and a second plurality of battery cells;
 a pair of conductors in electrical communication with the first electrical system and extending out of the main system enclosure;
 a first battery clamp electronically connected to a first conductor of the pair of conductors and disposed at an outer end of the first conductor; and
 a second battery clamp electronically connected to a second conductor of the pair of conductors and disposed at an outer end of the second conductor;
 wherein when the backup battery pack is disposed within the cradle the first electrical system is in electrical communication with the second electrical system and the boost circuit trickle charger supplies energy from the second plurality of battery cells to first plurality of battery cells when needed to ensure that the first plurality of battery cells are sufficiently charged to be able to start an electrical system of a vehicle in the event that a battery of the vehicle normally used to start the electrical system of the vehicle is depleted or too weak to properly function.

13. The combination portable automotive vehicle battery jumper pack and detachable backup battery pack of claim 12 wherein the first plurality of batteries are deep cycle sealed lead acid batteries and the second plurality of batteries are lithium ion batteries.

14. The combination portable automotive vehicle battery jumper pack and detachable backup battery pack of claim 12 wherein the first conductor of the pair conductors having a first voltage potential and the second conductor of the pair conductors having a second voltage potential and the first voltage potential and the second voltage potential are different and not the same.

15. The combination portable automotive vehicle battery jumper pack and detachable backup battery pack of claim 12 wherein said first electrical system including electrical circuitry or components for monitoring an energy level of the first plurality of battery cells and which are capable of replenishing lost energy of the first plurality of battery cells by drawing energy from the second plurality of battery cells of the backup battery pack when the backup battery pack is disposed within the cradle.

16. The combination portable automotive vehicle battery jumper pack and detachable backup battery pack of claim 12 wherein the backup battery pack further comprising at least one externally accessible USB port that is in electrical communication with the second electrical system, wherein the backup battery pack capable of charging or powering personal electronic devices through connection of a powering personal electronic device to the second electrical system through the at least one externally accessible USB port; wherein in use when said backup battery pack is properly disposed within the cradle area to mechanically secure the backup battery pack to the main system enclosure a portion of the backup battery pack having the at least one externally accessible USB port extends out of the cradle so not to cover the at least one USB port and to continue to allow access to the at least one USB port.

17. The combination portable automotive vehicle battery jumper pack and detachable backup battery pack of claim 12 wherein the backup battery pack having a rotatable male barrel connector in electrical communication with the second electrical system, the male barrel connector extending outward from a bottom surface of the backup battery pack in use to electrically connect the first electrical system to the second electrical system when the backup battery pack is disposed within the cradle area.

18. A combination portable automotive vehicle battery jumper pack and detachable backup battery pack, comprising:

a main system enclosure defining an internal area and an externally accessible cradle area;

a first electrical system housed within the internal area of the main system enclosure, the first electrical system including a first plurality of battery cells capable of providing enough energy to a depleted or weak automotive battery of a vehicle requiring a quick boost to start or turn over an engine's electrical system of the vehicle;

a detachable backup battery pack secured to the main system enclosure through being disposed within the externally accessible cradle area when in use for charging the first plurality of battery cells of the first electrical system, said backup battery pack having a second electrical system comprising a boost circuit trickle charger and a second plurality of battery cells, the backup battery pack further comprising a pair of externally accessible USB ports that are in electrical communication with the second electrical system, wherein the backup battery pack capable of charging or powering personal electronic devices through connection of a powering personal electronic device to the second electrical system through one of the pair of externally accessible USB ports; wherein in use when said backup battery pack is properly disposed within the cradle area to mechanically secure the backup battery pack to the main system enclosure a portion of the backup battery pack having the pair of externally accessible USB ports extends out of the cradle so not to cover the pair of USB ports and to continue to allow access to the pair of USB ports;

a pair of conductors in electrical communication with the first electrical system and extending out of the main system enclosure, a first conductor of the pair conductors having a first voltage potential and a second conductor of the pair conductors having a second voltage potential and the first voltage potential and the second voltage potential are different and not the same;

a first battery clamp electronically connected to the first conductor and disposed at an outer end of the first conductor; and a second battery clamp electronically connected to the second conductor and disposed at an outer end of the second conductor;

wherein said first electrical system including electrical circuitry or components for monitoring an energy level of the first plurality of battery cells and which are capable of replenishing lost energy of the first plurality of battery cells by drawing energy from the second plurality of battery cells of the backup battery pack when the backup battery pack is disposed within the cradle area;

wherein when the backup battery pack is disposed within the cradle the first electrical system is in electrical communication with the second electrical system and the boost circuit trickle charger supplies energy from the second plurality of battery cells to first plurality of battery cells when needed to ensure that the first plurality of battery cells are sufficiently charged to be able to start an electrical system of a vehicle in the event that a battery of the vehicle normally used to start the electrical system of the vehicle is depleted or too weak to properly function.

19. The combination portable automotive vehicle battery jumper pack and detachable backup battery pack of claim 18 wherein the first plurality of batteries are deep cycle sealed lead acid batteries and the second plurality of batteries are lithium ion batteries.

20. The combination portable automotive vehicle battery jumper pack and detachable backup battery pack of claim 18 wherein the backup battery pack having a rotatable male barrel connector in electrical communication with the second electrical system, the male barrel connector extending outward from a bottom surface of the backup battery pack in use to electrically connect the first electrical system to the second electrical system when the backup battery pack is disposed within the cradle area.

\* \* \* \* \*